United States Patent

Duc

Patent Number: 5,265,971
Date of Patent: Nov. 30, 1993

[54] DEVICE FOR FIXING PANELS FOR CONSTRUCTING A PIECE OF FURNITURE

[76] Inventor: Jean-Luc Duc, Rue de Derriveula, 3971 Chermignon d'en bas, Switzerland

[21] Appl. No.: 768,415

[22] PCT Filed: Feb. 1, 1991

[86] PCT No.: PCT/CH91/00026
§ 371 Date: Oct. 7, 1991
§ 102(e) Date: Oct. 7, 1991

[87] PCT Pub. No.: WO91/12435
PCT Pub. Date: Aug. 22, 1991

[30] Foreign Application Priority Data
Feb. 8, 1990 [CH] Switzerland .................. 398/90

[51] Int. Cl.⁵ ............................. F16B 12/00
[52] U.S. Cl. ............... 403/231; 403/252; 403/405.1; 403/257; 108/152
[58] Field of Search ........... 403/231, 252, 254, 257, 403/264, 407.1, 255, 262, 230, 405.1; 108/152, 134

[56] References Cited

U.S. PATENT DOCUMENTS

| | | | |
|---|---|---|---|
| 3,064,321 | 11/1962 | Rose | 403/231 |
| 4,664,548 | 5/1987 | Brinkmann | 403/231 X |
| 4,923,321 | 5/1990 | Kriz | 403/231 X |
| 4,930,931 | 6/1990 | Matsui | 403/407.1 X |

FOREIGN PATENT DOCUMENTS

| | | | |
|---|---|---|---|
| 02307A1 | 7/1980 | Fed. Rep. of Germany . | |
| 3821625 | 12/1989 | Fed. Rep. of Germany | 403/255 |
| 18418A5 | 2/9185 | Fed. Rep. of Germany . | |
| 908935 | 4/1946 | France . | |

Primary Examiner—Randolph A. Reese
Assistant Examiner—Harry C. Kim
Attorney, Agent, or Firm—Woodard, Emhardt, Naughton, Moriarty & McNett

[57] ABSTRACT

A device for fixing panels for constructing a piece of furniture, a bookcase, or a cupboard, comprises a first element which engages with a first panel, a second element which engages with a second panel designed to be assembled essentially perpendicular to the first panel, and a third element which engages with each the first and second elements, and a pulling device for acting on the third element so that when the two panels are assembled, the first and second elements are pulled toward each other. The third element is a high-tensile wire.

4 Claims, 1 Drawing Sheet

DEVICE FOR FIXING PANELS FOR CONSTRUCTING A PIECE OF FURNITURE

The present invention relates to a device for fixing panels together for constructing a piece of furniture, shelving, a cupboard or the like, according to the preamble of claim 1.

There are numerous fixing devices by means of which it is possible to connect two panels so as to construct, for example, shelving, namely:

- by means of screws and screw nuts with a right-angle bracket;
- by means of male and female elements mounted respectively on each of the two panels and designed so that when the latter are assembled they fit into one another; or
- by means of a pin, one end of which engages with a cam mounted inside the other panel, so that, by rotating the cam, the two panels are pressed towards one another.

In principle, when two panels are connected, the edge of one comes to lie flat against a face of the other.

The aforementioned fixing systems are perhaps well adapted to solid panels, but they have drawbacks with hollow panels of the type formed, for example, by two plates, which are joined at their periphery by means of a frame; in fact, when such hollow panels are interconnected by means of fixing devices known until now, they are subject to bending, torsional, pressure and shearing stresses which deteriorate them by local or overall deformation.

The problem raised above is resolved thanks to the fixing device according to claim 1.

There is now described an embodiment for fixing two panels which are designed to form shelving and connected by means of two devices as specified by the invention.

DESCRIPTION OF THE PREFERRED EMBODIMENT

Figure 1:
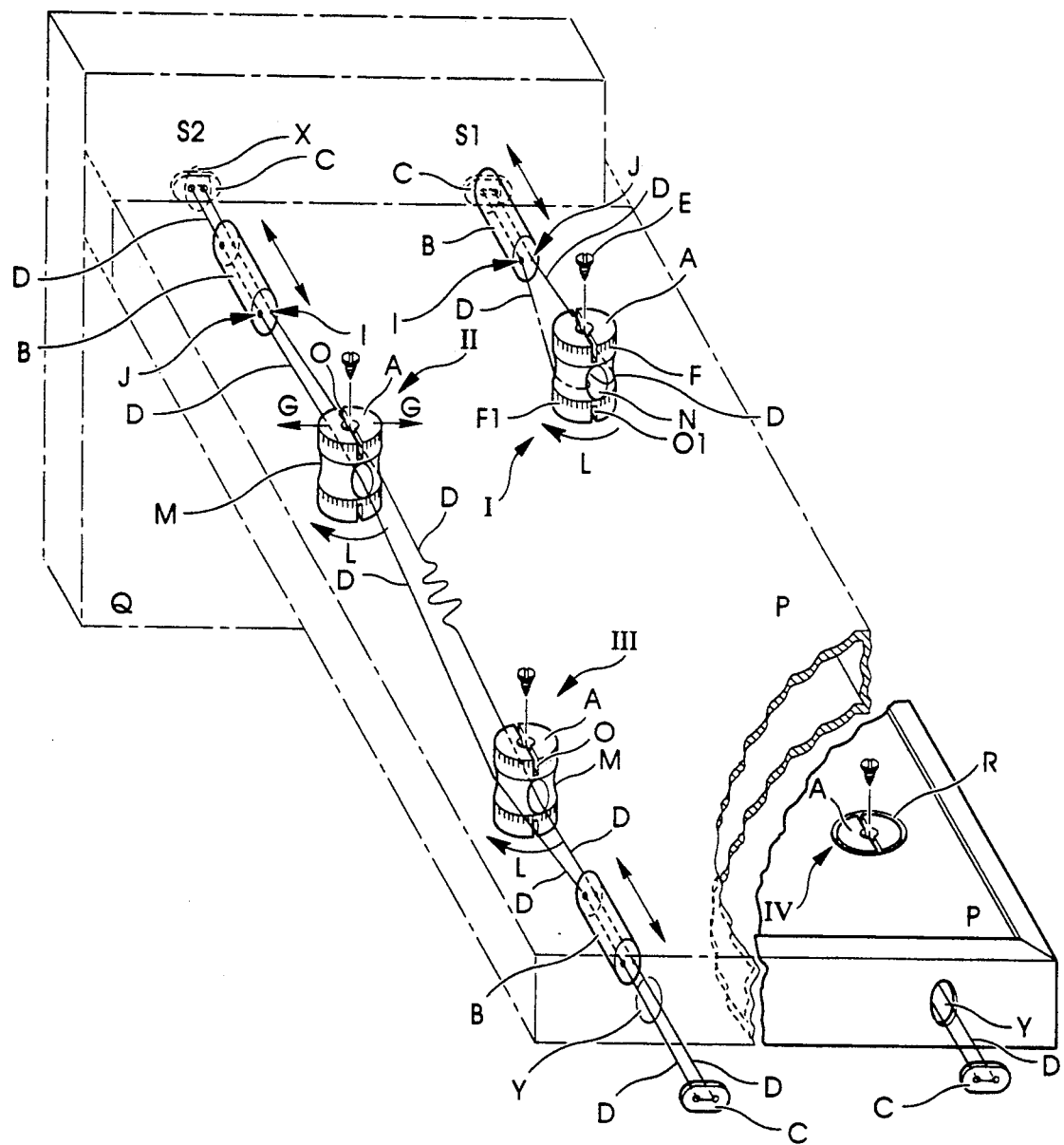
FIG. 1 diagrammatically shows two hollow panels P, Q by dot-and-dash lines so as to make it easier to understand the drawing.

The two panels P, Q are rectangular so as to form shelving. A horizontal panel P has to be fixed to another vertical panel Q so that an edge of the horizontal panel comes into contact with one of the faces of the vertical panel Q and so that thus the two panels P, Q are perpendicular to one another after assembly.

Of course a horizontal panel P is simultaneously connected to two vertical panels Q opposite one another. However, in FIG. 1 the second panel Q has not been shown so that the drawing does not become unnecessarily complicated.

The horizontal panel P is fixed to the vertical panel by means of two attachment devices S1 and S2, with S2 being slightly different from S1.

Each fixing device S comprises a pin A, a wire D, a rod B, a disc C and a screw E.

At each of its four corners, the horizontal panel P is provided with a circular aperture R which passes through its entire thickness or at least opens on one face. Into each of the apertures R there is introduced, in free rotation, an axle in the form of a pin A, the ends of which are approximately on the same level as the two faces of the horizontal panel P, as shown in the part of the drawing shown by thick continuous lines. In fact, the pin A is engaged in free rotation inside an aperture R provided in each of the two plates which form the horizontal panel P.

In system S1, a first end of the wire D is fixed to the pin A so that when the latter is brought into rotation, the wire is wound around it. The rod B is provided with two longitudinal passages I and J. The disc C is pierced by two holes. From the pin A, the wire firstly passes by freely sliding through a first passage J of the rod B, then also freely through a first and then the second hole in disc C, and finally through the second passage I of the rod B, but without being able to slide, to which rod B the second end of the wire D is fixed.

Before the assembly of the two panels P, Q, the fixing device is assembled inside the horizontal panel P so that the part of the wire D provided with the disc C emerges from an aperture Y provided in the longitudinal edge of the horizontal panel P, with the edge coming into contact with the vertical panel Q.

The dimensions and shape of the disc C and of the aperture Y are chosen so that the disc C can not pass through the aperture Y, or can only do so with difficulty.

Exactly opposite the aperture Y, at the place where the horizontal panel P has to be fixed onto the vertical panel Q, the latter is provided with an aperture X through which the disc C can pass.

Similarly, the dimensions and the shape of the aperture X are chosen so that the rod B can pass through this aperture with slight play.

It is possible to see on the drawing that, when disc C of the system S1 is put inside the vertical panel Q, a rotation of the pin A produces a reduction in the free length of the wire D, which firstly causes the disc C to come to lie flat against the internal surface of a wall of the vertical panel Q, with said surface situated at the site of aperture X, and secondly the rod B to move towards and through apertures X and Y to come to abut disc C.

The pin A is provided with a through hole N pierced perpendicular to its axis. At the height of the through hole N the periphery of the pin A is also provided with a radial groove so as to reduce the section of the walls surrounding the through hole N.

In each of the two end sections of the pin is made a slot 0, 01 situated on the axis of the pin. Similarly scores F, F1 parallel to the axis of the pin A are made on the periphery of each end of the latter.

The end of wire D passes partly around pin A inside groove M so that, when the latter is brought into rotation, its weakened central part, around which the wire D is wound, becomes compressed by the tension of the wire D, whereas the two end sections, provided with slots 0, 01, become larger by moving in the direction of arrows G, so as to effect rotational self-locking by the friction of the pin A against the walls of aperture R. Moreover a screw E is provided, which engages with a thread situated in one of the end sections of the pin A and serves to lock definitively the pin A. Of course the screw, which may be self-tapping, increases the safety of the attachment.

The function of the rod B, which fits into panel Q through aperture X, lies in the absorption of the shearing stresses between the two panels P, Q as, if the wire D has a good tensile strength, its shearing strength is generally poor. The wire D used is of the high-tensile type, for example made of carbon fibre, Kevlar, etc.

Thus, except for steel screws E, all the other components of the fixing device may be made from aluminium, which can be easily and economically recycled.

Dismantling is as easy as assembly, since all that needs to be done is remove the screws E, turn the pin A in the opposite direction to arrow L and then remove disc C through aperture X.

In system S2, so as to simplify assembly even more, it is proposed that a single wire D be used for two fixing devices II and III situated in the same horizontal panel and respectively near two opposite edges. Except for the circuit of the wire D, all the components A, B, C, E of system S2 are identical to those already described for system S1. Similarly, the circuit of wire D for a first fixing device II of system S2 is similar to I of the system S1. The circuit of the wire D for device III is formed by an extension of the wire D from pin A of device II, with the wire D then passing along the side of pin A of device III, then in sequence through:

passage J of rod B (with a sliding motion),
the two holes in disc C,
hole I in rod B (without a sliding motion),
hole N in pin A, before finally passing alongside pin A of the other device II and then without interruption rejoining rod B in the second passage I, with the wire as it were describing a closed circuit.

As can be seen on the drawings, in the case of system S2, it is possible, by rotating, for example, pin A of device II, to move its rod B and simultaneously that of device III. This also greatly facilitates the assembly or dismantling of the three panels, i.e. a horizontal panel P and two vertical panels Q. Moreover, by rotating pin A of device III wire D is tightened, which enables the two rods B of devices II and III to be simultaneously retracted after having released pin A of device II during the dismantling operation.

It should be noted that the tightening of wire D helps to improve the bending strength of horizontal panel P.

As an alternative, in system S1 it is also possible to extend wire D (shown by dot-and-dash lines) from the second passage I to pin A to which it will also be fixed, which will facilitate the dismantling of panel P, as a reverse rotation of the pin A, which has previously been released, will enable rod B to be retracted.

I claim:

1. A device for fixing panels for constructing a piece of furniture, shelving, or cupboard, comprising
   a first element (C) which engages with a first panel (Q),
   a second element (A) which engages with a second panel (P) that is to be assembled essentially perpendicular to the first panel (Q),
   a third element (D) which is a high-tensile filiform element and which engages with both the first and the second elements (C, A),
   means for acting on the third element (D), including a means for pulling so that when the first and second panels (P, Q) are assembled, the said first and second elements (C, A) are pulled towards one another, and
   a fourth element (B) mounted on said third element, which can be displaced between a first position in which it is located on the second panel (P) and a second position in which it engages with the first and second panels (P, Q) so as to withstand substantially the shearing stresses acting between the first and second panels.

2. A fixing device according to claim 1, characterized in that the second element (A) is a rotating pin, the axis of which is substantially perpendicular to the second panel (P), and the third element (D) is a wire having a first end and a second end, the first end being wound around the pin when it is forced into rotation, and the first element (C) is a disc provided with two holes through which the wire may freely slide, and the fourth element (B) is a rod provided with a longitudinal passage (J) along which the wire may freely slide, with the second end of the wire being fixed to the rod after having passed through the holes in the disc so that, by rotating the pin, the rod comes into engagement with two corresponding apertures (X, Y) made in the first and second panels (Q, P).

3. A device according to claim 2, characterized in that the pin (A) is held in place within an aperture (R) in the second panel (P) and has a first end section and a second end section and is further provided with a through hole (N) perpendicular to its axis of rotation and a peripheral radial groove (M) situated around the through hole (N) in order to provide on the pins weakened walls surrounding the trough hole (N), and two slots (0, 01) made respectively on the first and second end sections of the pin, whereby when the pin (A) is radially compressed when wire (D) is tensioned its two end sections become larger radially so as to lock the pin, in rotation, by friction of the pin (A) against the walls of the aperture (R) by which the pin is held in place in the second panel (P).

4. A device according to claim 3, characterized in that a screw (E), in engagement with a thread made in one of the end sections of the pin (A), is provided to assist the locking of the pin (A).

* * * * *

UNITED STATES PATENT AND TRADEMARK OFFICE
CERTIFICATE OF CORRECTION

PATENT NO.   : 5,265,971
DATED        : November 30, 1993
INVENTOR(S)  : Jean-Luc Duc It is certified that error appears in the above-identified patent and that said Letters Patent is hereby corrected as shown below:

Item 54 of the Title Page, after the word "FURNITURE" insert --OR THE LIKE--.

In column 1, line 2 of the title of the invention, after the word "FURNITURE" insert --OR THE LIKE--.

In column 2, line 47, change " 0, 01 " to -- 0, 01 --.

In column 2, line 55, change " 0, 01 " to -- 0, 01 --.

In column 4, line 42, change "(0, 01)" to --(0, 01)--.

Signed and Sealed this

Nineteenth Day of July, 1994

Attest:

BRUCE LEHMAN

*Attesting Officer*          *Commissioner of Patents and Trademarks*